United States Patent [19]
Umeha et al.

[11] Patent Number: 4,615,310
[45] Date of Patent: Oct. 7, 1986

[54] CAMSHAFT WITH LUBRICATING OIL SUPPLYING FUNCTION

[75] Inventors: Genkichi Umeha, Tokyo; Osamu Hirakawa, Yono, both of Japan

[73] Assignee: Nippon Piston Ring Co., Ltd., Tokyo, Japan

[21] Appl. No.: 740,847

[22] PCT Filed: Mar. 23, 1984

[86] PCT No.: PCT/JP84/00129
§ 371 Date: May 17, 1985
§ 102(e) Date: May 17, 1985

[87] PCT Pub. No.: WO85/01557
PCT Pub. Date: Apr. 11, 1985

[30] Foreign Application Priority Data

Sep. 28, 1983 [JP] Japan ................. 58-178249

[51] Int. Cl.$^4$ ............................................. F01H 9/10
[52] U.S. Cl. ........................... 123/90.34; 123/90.33
[58] Field of Search .......... 123/90.27, 90.34, 90.33, 123/90.38

[56] References Cited
U.S. PATENT DOCUMENTS

| | | | |
|---|---|---|---|
| 1,175,720 | 3/1916 | Delaunay-Belleville | 123/90.34 |
| 1,264,494 | 4/1918 | D'Orville | 123/90.34 |
| 1,469,063 | 9/1923 | Wills | 123/90.34 |
| 1,590,073 | 6/1926 | Birkigt | 123/90.34 |
| 1,848,008 | 3/1932 | Griffith | 123/90.34 |

Primary Examiner—Ira S. Lazarus
Attorney, Agent, or Firm—Birch, Stewart, Kolasch & Birch

[57] ABSTRACT

A hollow portion of a tubular shaft (1) contains an elastic filler element (4) which has projections (6) formed on the outer periphery thereof. A lubricating-oil passage is defined between the inner peripheral surface of the hollow portion of the shaft (1) and the outer peripheral surface of the filler element (4) by the projections (6) which are in close, resilient contact with the inner peripheral surface of the hollow portion. Since the lubricating-oil passage has a relatively small volume, lubricating oil quickly fills into the passages and is supplied to the sliding surfaces of the cams during the start up operations.

8 Claims, 4 Drawing Figures

CAMSHAFT WITH LUBRICATING OIL SUPPLYING FUNCTION

TECHNICAL FIELD

The present invention relates to a camshaft of the type having a lubricating-oil supplying function for use in the valve mechanism of an internal combustion engine. More particularly the present invention is directed to an improved camshaft consisting of a tubular shaft, an oil inlet for feeding oil to the inside of the shaft and an outlet for supplying oil to the sliding surface of each cam from the inside of the shaft.

BACKGROUND ART

A tubular camshaft is recently used in an internal combustion engine to meet the requirement of weight-reduction. The inside capacity of a tubular camshaft is usually too large to be used as an oil passage. If it were used as an oil passage without being modified, the sliding surface would scuff due to poor lubrication in the starting period, because too much time would be needed for the oil to fill the capacity prior to attending to the sliding surface. Therefore, it has been proposed to reduce the inside capacity of the tubular camshaft.

The camshaft with a modified inside capacity is known by JP A 55-132417 and JP U 57-75105. The former has double inner and outer cylindrical fillers coaxially fitted in a tubular shaft, the inner filler being oil-permeable and disposed inside the outer filler which is formed with an oil passage. The latter has a single filler of resin or foamed material fitted in a tubular shaft, the filler being formed with an oil passage by machining. However, the known camshafts are disadvantageously costly in production. The former needs a couple of fillers and expensive machining works to provide an oil passage in the outer filler. The latter needs a special die or core to mold the filler and costly machining works to form an oil passage after the filler is molded.

The present invention is intended to resolve the problem as described above and provide a tubular camshaft with a lubricating-oil supplying function that can be easily manufactured without expensive machining works. It also provides a camshaft wherein the sliding surface is well lubricated and protected against scuffing in the starting period.

DISCLOSURE OF THE INVENTION

To attain the above mentioned object, the present invention utilizes a camshaft having a tubular shaft and a filler element inserted into the tubular shaft, the filler having its outer surface formed with a plurality of projections to define an oil passage together with the inner surface of the tubular shaft. The filler is preferably tubular to reduce weight. The projections may be either separated from each other or connected in the form of a continuous helix.

The advantages offered by the present invention are mainly as follows:

(1) The camshaft is easily manufactured without needing expensive machining work; the camshaft is free from scuffing normally caused by poor lubrication in the starting period, by the use of a simple filler element containing a plurality of projections which define an oil passage within the tubular shaft.

(2) The relatively light camshaft is obtained by coupling the tubular shaft with a light-weight filler element.

(3) The camshaft has an oil passage with a relatively small capacity defined by the projections formed on the outer surface of the filler element.

(4) The filler element is made of a synthetic resin material and is tightly fixed to the tubular shaft by the use of a resilient connection between the projections and the inner surface of the tubular shaft, so that the camshaft may have a somewhat large tolerance (about 0.5 mm) in the inner diameter.

BEST MODE OF CARRYING OUT THE INVENTION

The present invention will be explained in detail below with reference to drawings which illustrate preferred embodiments of the present invention.

Figure 1:
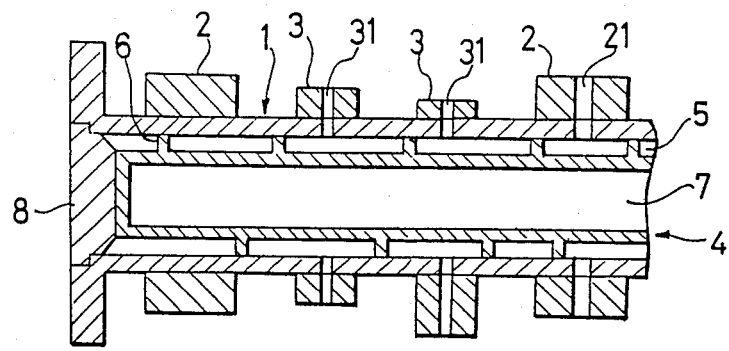
FIG. 1 is a side section of the first embodiment of the present invention.
Figure 2:
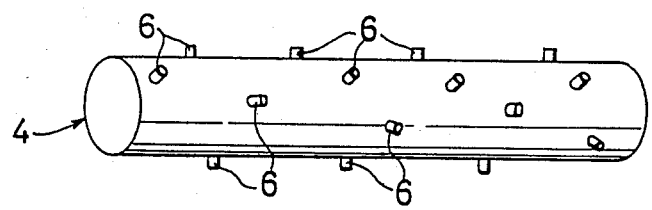
FIG. 2 is a perspective view of the filler element.

The side section of the first embodiment and the perspective view of the filler element are respectively shown in FIGS. 1 and 2. Journals 2 and cam lobes 3 are fixedly mounted on a camshaft 1 having a hollow portion 5. The journal 2 and the cam lobe 3 are respectively formed with an inlet 21 and an outlet 31 through which lubricating oil passes.

A filler element 4 is inserted into the hollow portion 5 of the camshaft 1 and is provided on its outer surface with a plurality of projections 6 which are separated from each other. The projections contact the inner surface of the camshaft to define an oil-passage between the outer surface of the filler element and the inner surface of the camshaft. The oil passage has such a small capacity that the lubricating oil is rapidly supplied to effectively prevent the sliding surface from scuffing during the starting period. As seen in FIG. 1, the filler 4 is preferably formed with a hollow portion 7 for the purpose of making it light.

A plug 8 is fitted at the end of the camshaft to prevent the filler element from axially falling out of the camshaft.

Figure 3:
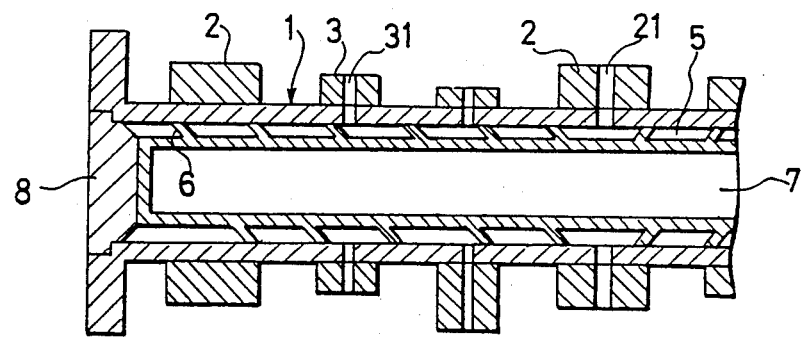
FIG. 3 is a side section of a second embodiment of the present invention.
Figure 4:
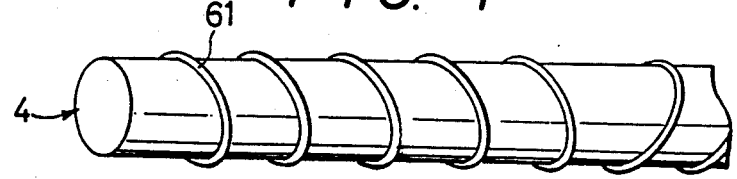
FIG. 4 is a perspective view of the filler element of FIG. 3.

A side section of a second embodiment is shown in FIG. 3 and a prespective view of the filler of FIG. 3 is shown in FIG. 4, in which the same elements as in FIGS. 1 and 2 are indicated by the same reference numerals. The second embodiment has the projections connected to each other in the form of a helix disposed on the outer surface of the filler element 4. The helically connected projections permit a more rapid and sufficient supply of the lubricating oil in the starting period. The helically connected projections 61 turn in both directions from the inlet of the journal, forming both right and left parts of the helix with the directions being opposite to each other.

We claim:

1. A camshaft with a lubricating-oil supplying function comprising a tubular shaft and a filler element disposed in said tubular shaft to control the amount or rate of oil distribution, said filler element containing a plurality of projections extending along its length from the outer surface thereof and resiliently contacting the inner surface of the tubular shaft, said projections together with the inner surface of said tubular shaft defining a plurality of oil passages.

2. The camshaft of claim 1, wherein said filler element is a tube sealed at the opposite ends thereof.

3. The camshaft of claim 1, wherein said projections are separated from each other on the outer surface of said filler element to define separated oil passages.

4. The camshaft of claim 1, wherein said projections (61) are connected with each other in the form of a helix on the outer surface of the filler element.

5. The camshaft of claim 4 wherein the filler element is made of a synthetic resinous material.

6. The camshaft of claim 5, wherein filler element is tightly fixed to the tubular shaft by the use of a resilient connection between the projections and the inner surface of the tubular shaft.

7. The camshaft of claim 1, wherein journals and cam lobes are mounted on the camshaft, said journals and cam lobes being formed with inlet and outlet means through which the lubricating oil passes.

8. The camshaft of claim 4, wherein the helically connected projections turn in opposite directions from the inlet of the journal.

* * * * *